US012584542B2

(12) United States Patent     (10) Patent No.: US 12,584,542 B2
Dötschel et al.     (45) Date of Patent: Mar. 24, 2026

(54) TRANSMISSION AND DRIVE TRAIN FOR A MOTOR VEHICLE

(71) Applicant: ZF Friedrichshafen AG, Friedrichshafen (DE)

(72) Inventors: Philip Dötschel, Friedrichshafen (DE); Tamas Gyarmati, Bermatingen (DE); Thomas Riedisser, Sigmarszell (DE); Hagen Doepfert, Lindau (DE); Martin Brehmer, Tettnang (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/639,165

(22) Filed: Apr. 18, 2024

(65) Prior Publication Data

US 2024/0360889 A1    Oct. 31, 2024

(30) Foreign Application Priority Data

Apr. 28, 2023   (DE) .......................... 102023203968.0

(51) Int. Cl.
*F16H 3/64*     (2006.01)
*F16H 48/10*     (2012.01)

(52) U.S. Cl.
CPC ......... *F16H 3/64* (2013.01); *F16H 2048/104* (2013.01); *F16H 2048/106* (2013.01); *F16H 2200/201* (2013.01)

(58) Field of Classification Search
CPC ........ F16H 1/46; F16H 1/48; F16H 2003/442; F16H 3/64; F16H 2200/2007;
(Continued)

(56) References Cited

U.S. PATENT DOCUMENTS 4,776,237 A * 10/1988 Premiski ............. F16H 57/0482
                                            475/159
5,845,732 A    12/1998 Taniguchi et al.
(Continued)

FOREIGN PATENT DOCUMENTS

DE     102021207527 A1 * 1/2023 ......... F16H 57/0426
WO    WO-2005120877 A1 * 12/2005 ............. B60K 17/16

OTHER PUBLICATIONS

English translation of DE102021207527A1; http://translationportal.epo.org; Sep. 17, 2024 (Year: 2024).*
(Continued)

*Primary Examiner* — Roger L Pang
(74) *Attorney, Agent, or Firm* — Dority & Manning, P.A.

(57) ABSTRACT

A transmission has a differential including a first planetary gear set having a first gear set element connected to an input shaft for conjoint rotation, a second gear set element at least indirectly connected to a first output shaft for conjoint rotation, and a third gear set element that is a ring gear. The differential further includes a second planetary gear set having a first gear set element that is a sun gear, a second gear set element non-rotationally connected to a positionally fixed component, and a third gear set element at least indirectly connected to a second output shaft for conjoint rotation. The differential also includes a connector connecting the ring gear of the first planetary gear set and the sun gear of the second planetary gear set for conjoint rotation, where the connector and the ring gear of the first planetary gear set are integrally bonded.

11 Claims, 2 Drawing Sheets

(58) Field of Classification Search
CPC ......... F16H 2057/085; F16H 2048/104; F16H 2048/106; F16H 2048/387; F16H 48/05; B60Y 2400/804; B60K 17/165
USPC ....... 475/219, 220, 337, 332, 330, 346, 347, 475/903
See application file for complete search history.

(56)                         References Cited

U.S. PATENT DOCUMENTS

| | | | |
|---|---|---|---|
| 8,210,984 B2 * | 7/2012 | Schaeffer ............ | F16H 55/0806 |
| | | | 475/331 |
| 12,253,150 B2 * | 3/2025 | Gyarmati ................ | F16H 48/11 |
| 2005/0032604 A1 * | 2/2005 | Hill ........................... | F16H 3/66 |
| | | | 475/317 |
| 2020/0088291 A1 * | 3/2020 | Payne ................... | F16H 57/082 |
| 2022/0203814 A1 * | 6/2022 | Reisch ...................... | F16H 1/46 |
| 2022/0355663 A1 * | 11/2022 | Beck ....................... | F16H 48/36 |

OTHER PUBLICATIONS

CN114393991A with English translation; Zhao et al. ; Apr. 26, 2022 (Year: 2025).*

* cited by examiner

TRANSMISSION AND DRIVE TRAIN FOR A MOTOR VEHICLE

CROSS-REFERENCE TO RELATED APPLICATION

The present application is related and has right of priority to German Patent Application No. 10 2023 203 968.0 filed on Apr. 28, 2023, the entirety of which is incorporated by reference for all purposes.

FIELD OF THE INVENTION

The invention relates generally to a transmission for a drive train of a motor vehicle, the transmission including an input shaft, a first output shaft, a second output shaft, and a differential, where the differential is effective between the input shaft and the two output shafts, and where the differential has at least two planetary gear sets. The invention further relates generally to a drive train for a motor vehicle, the drive train including a transmission of this type and a prime mover operatively connected thereto. The invention also relates generally to a motor vehicle which has at least one drive train of this type.

BACKGROUND

U.S. Pat. No. 5,845,732 A describes a drive train for an electric vehicle, the drive train including a motor, two output shafts, one of which extends through the motor, and a transmission mechanism, which is coaxial with the output shafts, and reduces the rotational speed of the motor in order to transmit the rotation at a reduced speed onto the output shafts. The transmission mechanism has a first planetary transmission unit including a first transmission element which is coupled to the motor, a second transmission element which is coupled to one of the output shafts, and a third transmission element. Furthermore, a second planetary transmission unit is provided, which includes a fourth gear wheel or "transmission" element which is coupled to the third gear wheel element of the first planetary transmission unit, a stationary fifth gear wheel element, and a sixth gear wheel element which is coupled with the other one of the output or "drive" shafts of the transmission.

SUMMARY OF THE INVENTION

The present invention provides a transmission for a drive train, which is radially more compact or allows for a higher transmission ratio given the same installation space.

According to a first aspect of the invention, a transmission for a drive train of a motor vehicle has an input shaft, a first output shaft, a second output shaft, and a differential effective between the input shaft and the two output shafts. The differential has a first planetary gear set, which includes multiple gear set elements, and at least one second planetary gear set, which includes multiple gear set elements and is operatively connected to the first planetary gear set. A first gear set element of the first planetary gear set is connected to the input shaft for conjoint rotation. A second gear set element of the first planetary gear set is at least indirectly connected to the first output shaft for conjoint rotation. A third gear set element of the first planetary gear set, which is a ring gear, is at least indirectly connected to a first gear set element of the second planetary gear set, which is a sun gear, for conjoint rotation. A second gear set element of the second planetary gear set is non-rotationally connected to a positionally fixed component, and a third gear set element of the second planetary gear set is at least indirectly connected to the second output shaft for conjoint rotation. The sun gear of the second planetary gear set and the ring gear of the first planetary gear set are connected to each other via a connecting component or "connector" for conjoint rotation, and the connecting component and the ring gear of the first planetary gear set are integrally bonded. The ring gear of the first planetary gear set is connected to the sun gear of the second planetary gear set via the connecting component for conjoint rotation.

By the first planetary gear set, a first output torque is at least indirectly transmittable onto the first output shaft, a support torque of the first planetary gear set being convertible in the second planetary gear set such that a second output torque, which corresponds to the first output torque, is transmittable onto the second output shaft.

The input shaft is preferably at least indirectly connected to a drive shaft of a prime mover for conjoint rotation. The prime mover generates a drive power, which is transmitted via the drive shaft onto the input shaft. The drive shaft of the prime mover is connectable to the input shaft for conjoint rotation. Alternatively, the drive shaft of the prime mover and the input shaft of the transmission are an integral, single component. Depending on the drive train, two or more input shafts are also providable, in particular when the drive train is a hybridized power train and, therefore, two or more prime movers are provided.

The input shaft is a solid shaft or a hollow shaft, depending on the transmission. The input shaft is preferably a hollow shaft. As a result, one of the output shafts, preferably the first output shaft, extends axially through the input shaft. Preferably, one of the output shafts, in particular the first output shaft, extends through the transmission and potentially through the prime mover. Therefore, the output shaft extends "inline" through the transmission in order to transmit a drive power onto the wheel, which is operatively connected thereto. The output shafts in this case are advantageously coaxial. Due to the coaxial arrangement of the output shafts, a radially slender transmission is achieved. An arrangement of the output shafts in which the output shafts are parallel to and offset from one another is also conceivable, for example, by providing a further gear stage, which implements an axial offset.

A "shaft" is understood to mean a rotatable component in the transmission with which associated components in the transmission are connected to one another for conjoint rotation, or via which such a connection is established when a corresponding shift element is actuated. The shaft connects the components axially or radially, or even axially and radially, to one another. A shaft does not have to be a, for example, cylindrical, rotatably mounted machine element for transmitting torques. Instead, the shaft is any connecting element which connects individual components or elements to one another, in particular a connecting element which connects multiple elements to one another for conjoint rotation.

If two components of the transmission are "connected or coupled for conjoint rotation," this means, as set forth in the invention, that there is a permanent coupling between these components, such that they cannot rotate independently of one another. This is also understood to be a permanent rotary joint. In particular, there are no shift elements between these components, where such components are elements in the differential, shafts, and/or a non-rotating component in the transmission. Instead, these components are permanently coupled to one other. An elastically rotating connection between two components is also understood to be permanent, or such that the components rotate conjointly.

A connecting component or "connector" as set forth in the invention is a component which is used for connecting the ring gear of the first planetary gear set and the sun gear of the second planetary gear set. The connecting component is provided for transmitting a torque between the two planetary gear sets, or between the ring gear of the first planetary gear set and the sun gear of the second planetary gear set. Furthermore, the connecting component is provided for axially positioning the ring gear of the first planetary gear set relative to the sun gear of the second planetary gear set, and vice versa. Accordingly, the ring gear of the first planetary gear set and the sun gear of the second planetary gear set are axially immovable with respect to one another due to the connecting component.

In the framework of this invention, a material bond is understood to mean a connection between two components, which is established by bonding forces at the atomic, or molecular, level. This includes, in particular, adhesion and chemical bonding. Preferred examples of material bonds are connections established by bonding, soldering, riveting, or welding. A material bond between the connecting component and the ring gear of the first planetary gear set, such as a welded joint having at least one weld, is considered to be advantageous. An adhesive bond having at least one adhesive joint is also conceivable. Due to the material bond between the ring gear of the first planetary gear set and the connecting component, axial forces and tangential forces are reliably transmitted between the planetary gear sets. Due to the material bond, torque transmission by the components is achieved and the components are axially secured.

The connecting component and the ring gear of the first planetary gear set are multiple parts, preferably two parts, in the original state, i.e., prior to the assembly of the transmission, and joined via material bonding to form an integral part only during the production, or assembly, of the transmission.

Preferably, the connecting component and the sun gear of the second planetary gear set are formed in one piece. Accordingly, the connecting component is part of the sun gear and thus part of the second planetary gear set. The connecting component and the sun gear of the second planetary gear set are producible from one piece. Alternatively, the connecting component and the sun gear of the second planetary gear set are formed in two parts in the original state, i.e., prior to the assembly of the transmission, and joined, for example, via an interlocking connection and/or a material bond, to form an integral part only during the production, or assembly, of the transmission. A two-part design of the connecting component and the sun gear of the second planetary gear set is sometimes more advantageous for production reasons, in particular for producing the toothing of the sun gear. Due to a two-part and subsequently produced connection, the transmission, in particular the sun gear of the second planetary gear set, is more easily and cost-effectively produced.

A material bond between the sun gear of the second planetary gear set and the connecting component, such as a welded joint having at least one weld, is considered to be advantageous. An adhesive bond having at least one adhesive joint is also conceivable. When the connecting component is integrally connected to the sun gear, once the transmission is assembled, the sun gear of the second planetary gear set and the ring gear of the first planetary gear set are an integral component of the transmission. Due to the material bond between the sun gear of the second planetary gear set and the connecting component, axial forces and tangential forces are reliably transmitted between the two components.

The connecting component is, for example, a flange-like component, which bridges, in particular, differences in radial diameter between the sun gear of the second planetary gear set and the ring gear of the first planetary gear set. Therefore, the connecting component has an essentially radially extending portion. In order to bridge axial distances or spaces, the connecting component also has an essentially axially extending portion. The connecting component is, for example, a coupling shaft between the ring gear of the first planetary gear set and the sun gear of the second planetary gear set.

In a transmission of this type, the sums of the two wheel torques are not combined in one rotating component as a single axle torque. Instead, the drive power which is introduced into the input shaft is divided in the differential and, in accordance with the design and connection of the planetary gear sets, transmitted further into the output shafts which are operatively connected thereto. Due to the relatively low torque, the components of the differential are therefore more slender. Moreover, the number of components is reduced and weight is reduced. A transmission is therefore provided, which both converts and distributes the torque by the integral differential, which previously required two separate assemblies instead of a single, integral assembly. The invention therefore relates to a combined transmission and differential gear, which converts as well as distributes torque onto the output shafts, and also implements power splitting.

The differential is understood to be an integral differential, and the transmission is therefore a differential gear. An integral differential is understood to be a differential which has both a first planetary gear set and at least one further planetary gear set in the framework of this invention, where the further planetary gear set is operatively connected to the first planetary gear set.

For a differential having precisely two planetary gear sets, the first planetary gear set is drivingly connected to the input shaft, to the second planetary gear set and, at least indirectly, to the first output shaft. In addition, the second planetary gear set is drivingly connected to the second output shaft. By such an integral differential, the input torque at the input shaft is convertible, and is distributable, or transmittable, at a defined ratio to the two output shafts. Preferably 50%, i.e., half, of the input torque is transmitted to each of the output shafts. Therefore, the differential does not have a rotating component, at which the sum of the two output torques is applied. In other words, the two torques are never combined. Furthermore, the differential has no gears that rotate in a block, or without a rolling motion, when the output rotational speeds of the output shafts are identical. Furthermore, the intermeshed components of the differential always rotate in relation to one another, independently of the output rotational speeds of the output shafts.

It is conceivable that the differential also has three or more planetary gear sets which are operatively connected to one another. In this case, one of the planetary gear sets is arranged on the input end and is drivingly connected to the two other planetary gear sets, via which the output onto the first and/or the second output shaft(s) takes place. The differential in this case does not have a rotating component, either, at which the sum of the two output torques is applied, and therefore the two torques are never combined.

The output shafts of the transmission are, in particular, operatively connected to a respective wheel of the vehicle.

The respective output shaft is connectable to the associated wheel directly or indirectly, for example, via a joint and/or a wheel hub.

The differential is a planetary transmission which includes at least two planetary gear sets and the gear set elements, including a sun gear, a ring gear, and multiple planet gears, which are guided by a planet carrier on a circular path around the sun gear. A "planetary gear set" is understood as a unit having multiple gear set elements including a sun gear, a ring gear, and a planet carrier, with at least one planet gear, preferably multiple planet gears, being rotatably mounted on the planet carrier and guided by the planet carrier on a circular path around the sun gear, wherein the planet gear or the planet gears is/are meshed with the ring gear and/or the sun gear depending on the planetary gear set.

A positionally fixed component, as set forth in the invention, is understood as a rotationally and axially fixed component of the transmission, for example, the transmission housing. Accordingly, the positionally fixed component is secured to the housing. The term "secured to the housing" is understood to mean that relative motion does not take place, or cannot take place, between the gear set element which is secured to the housing and the positionally fixed component of the transmission.

Preferably, the two planetary gear sets are axially adjacent to one another. In other words, the planetary gear sets are arranged axially one behind the other, such that a radially compact transmission is provided.

Preferably, an outer diameter of the ring gear of the first planetary gear set is greater than an inner diameter of the sun gear of the second planetary gear set, which is at least indirectly connected to said ring gear for conjoint rotation. Therefore, the planetary gear sets are coaxial but overlap in a radial direction, and the second planetary gear set has larger outer dimensions than the first planetary gear set. The space radially inside the second planetary gear set is also usable for components of the transmission or of the drive train, for example, for shaft bearings. Due to such an arrangement of the planetary gear sets, in comparison to conventional radially nested planetary gear sets, radial installation space is nevertheless reduced. Alternatively, or additionally, in comparison to conventional radially nested planetary gear sets having the same radial installation space, the transmission ratio of the transmission is increased. Therefore, due to a transmission of this type, high transmission ratios are achieved while maintaining high power density and efficiency. In addition, the installation space required by the transmission is optimized.

Preferably, a first thrust collar is effective between the connecting component and at least one first planet gear of the first planetary gear set. Preferably, a second thrust collar is effective between a pressure disk, which is arranged in an axially fixed manner at the ring gear of the first planetary gear set, and at least one first planet gear of the first planetary gear set. The thrust collars are provided for axially securing the at least one first planet gear of the first planetary gear set relative to the ring gear of the first planetary gear set.

Preferably, the first thrust collar has a first opposing running surface, which is formed on or defined by the connecting component, and a second opposing running surface, which is formed on or defined by a side of the at least first planet gear of the first planetary gear set facing the connecting component. Preferably, the second thrust collar has a third opposing running surface, which is formed on or defined by a pressure disk, and a fourth opposing running surface, which is formed on or defined by a side of the at least first planet gear of the first planetary gear set facing the pressure disk, the pressure disk being axially secured at the ring gear of the first planetary gear set.

Two opposing running surfaces thus form a pair of opposing running surfaces in order to provide or define the thrust collar, the opposing running surfaces being complementary such that the power losses are as low as possible. The opposing running surfaces of each pair of opposing running surfaces of the first and the second thrust collars do not come to rest against one another during normal operation, in order to avoid undesired losses due to friction between the connecting component and the at least first planet gear of the first planetary gear set. During normal operation, there is an air gap between the opposing running surfaces of the two pairs of opposing running surfaces. For example, when load changes or load peaks occur, the at least first planet gear of the first planetary gear set is movable axially relative to the first ring gear of the first planetary gear set. In this case, depending on the direction of motion of the at least first planet gear of the first planetary gear set, the first and the second opposing running surfaces or the third and the fourth opposing running surfaces come to rest against one another. Due to the pairs of opposing running surfaces, or the thrust collars, the at least first planet gear of the first planetary gear set is also held, or fixed, in its axial position in operating situations which deviate from the normal operation.

Accordingly, functions are integrated at the sun gear of the second planetary gear set. Specifically, the sun gear is a gear set element of the second planetary gear set, a torque is transmitted between the ring gear of the first planetary gear set and the sun gear of the second planetary gear set via the connecting component, which is rigidly, preferably integrally, connected to the sun gear, and an opposing running surface is formed on the connecting component for implementing the above-described thrust-collar function.

The pressure disk is a securing ring or the like. Accordingly, the pressure disk preferably has the shape of an annular disk. The ring gear of the first planetary gear set has a circumferential groove in which the pressure disk is radially accommodated and thus axially secured. Alternatively, the pressure disk is a rigid, annular disk-shaped element, which is axially secured by a separate securing ring or the like. In this sense, the securing ring is arranged and accommodated in the groove in the ring gear of the first planetary gear set. In this sense, the pressure disk is axially secured on the ring gear of the first planetary gear set by a first securing ring.

According to one exemplary embodiment, the first gear set element of the first planetary gear set is also a sun gear, the second gear set element of each planetary gear set of the differential is a planet carrier, and the third gear set element of the second planetary gear set is also a ring gear. Accordingly, the input shaft is connected to the sun gear of the first planetary gear set for conjoint rotation, and the planet carrier of the first planetary gear set is at least indirectly connected to the first output shaft for conjoint rotation. The input shaft and the sun gear of the first planetary gear set are formed in one piece, provided that no further transmission components or assemblies are effective between the input shaft and the sun gear of the first planetary gear set. Furthermore, in this sense, the planet carrier of the second planetary gear set is fixed in position, for example, at a housing of the transmission, and the ring gear of the second planetary gear set is at least indirectly connected to the second output shaft for conjoint rotation.

With the exception of the ring gear of the first planetary gear set and of the sun gear of the second planetary gear set, which are connected to one another via the connecting component for conjoint rotation, the connections of the gear set elements are interchangeable in any way depending on the requirement on the transmission ratios. In other words, the connection of the gear set elements are variable in any way. Further components, for example, intermediate shafts or coupling shafts, are also arrangeable between the aforementioned components, i.e., the gear set elements of the planetary gear sets of the differential.

The first planetary gear set is preferably a negative planetary gear set. The second planetary gear set is a negative planetary gear set or a positive planetary gear set.

A negative planetary gear set corresponds to a planetary gear set having a planet carrier on which first planet gears are rotatably mounted, a sun gear and a ring gear, in which the toothing of at least one of the planet gears meshes with the toothing of the sun gear and with the toothing of the ring gear, such that the ring gear and the sun gear rotate in opposite directions when the sun gear rotates while the carrier is held. A positive planetary gear set differs from the negative planetary gear set in that the positive planetary gear set has first and second, or inner and outer, planet gears, which are rotatably mounted on the planet carrier. The toothing of the first, or inner, planet gears meshes with the toothing of the sun gear and with the toothing of the second, or outer, planet gears, where the toothing of the outer planet gears also meshes with the toothing of the ring gear. This means that when the planet carrier is held, the ring gear and the sun gear rotate in the same direction. When one or more of the planetary gear sets is a positive planetary gear set, the connection of the planet carrier and the ring gear is interchanged and the absolute value of the stationary transmission ratio is increased by 1. Correspondingly, this is also possible the other way around when a negative planetary gear set is to be provided in place of a positive planetary gear set.

Alternatively, it is also conceivable for one or both planetary gear set(s) to be a stepped planetary gear set or stepped planetary gear sets. Each stepped planetary gear of the stepped planetary gear set preferably has a first gear wheel with a second gear wheel connected thereto for conjoint rotation. The first gear wheel is preferably meshed, for example, with the sun gear, and the second gear wheel is therefore meshed with the ring gear, or vice versa. These two gear wheels are connectable to one another for conjoint rotation, for example, via an intermediate shaft or a hollow shaft. In the case of a hollow shaft, the hollow shaft is rotatably mounted on a pin of the planet carrier. Preferably, the two gear wheels of the respective stepped planetary gear set have different diameters and numbers of teeth in order to adjust a transmission ratio. Composite planetary gear sets are also conceivable.

The term "operatively connected" refers to a permanent connection between two components, the permanent connection being provided for permanently transmitting a drive power, in particular rotational speed and/or torque. The connection is established directly, i.e., as a connection for conjoint rotation, or via a fixed transmission ratio. The connection is implemented, for example, via a fixed shaft, a toothing, in particular a spur gear tooth system, and/or a wrap-around element.

The term "at least indirectly" is understood to mean that two components are (operatively) connected to one another via at least one further component, which is arranged between the two components, or are directly connected to one another. Therefore, other components are arrangeable between shafts or gear wheels, the components being operatively connected to the shaft or to the gear wheel.

According to a second aspect of the invention, a drive train for a motor vehicle has a transmission as described herein and a prime mover which is operatively connected thereto. The prime mover is preferably an electric machine, and the input shaft of the transmission is a rotor of the electric machine or is connected or coupled to the rotor or to a rotor shaft of the electric machine for conjoint rotation. The rotor is rotatably mounted with respect to a stator of the electric machine, which is secured to the housing. The electric machine is preferably connected to an accumulator, which supplies the electric machine with electrical energy. Furthermore, the electric machine is preferably controllable by way of an open-loop or closed-loop system by a power electronics system. When the prime mover is an electric machine, an electric drive of the motor vehicle is implementable by the drive train. Alternatively, the prime mover is or also includes an internal combustion engine. The input shaft in this case is, for example, a crankshaft, or is connected or coupled to the crankshaft for conjoint rotation.

Preferably, the prime mover is coaxial to the integral differential. An additional speed change from the input shaft onto the rotor shaft, or the rotor, or the crankshaft of the prime mover, is therefore not necessary. One of the output shafts, preferably the first output shaft, extends axially through the prime mover in this case.

Further interconnected components are arrangeable between the input shaft of the transmission and the prime mover, such as, for example, a planetary transmission, a spur gear drive, a sprocket, a belt drive, a bevel gear, a universal joint shaft, a torsional shock absorber, a multi-speed transmission or the like. Further interconnected components are arrangeable between the output shaft and the wheel operatively connected thereto, such as, for example, universal joint shafts, transmission gearing, spring and damping elements, or the like.

Preferably, the first planetary gear set is arranged axially between the prime mover and the second planetary gear set. Therefore, in particular, the preferably radially smaller, first planetary gear set is arranged axially between the relatively larger, second planetary gear set and the prime mover. This is advantageous for an optimal utilization of the installation space available in the motor vehicle.

According to a third aspect of the invention, a motor vehicle according to the invention has at least one drive train according to the second aspect of the invention. The drive train according to the invention is therefore usable in a motor vehicle, in particular, in an automobile (for example, a passenger car weighing less than 3.5 tons), a bus, or a truck (busses and trucks weighing more than 3.5 tons). The motor vehicle is, in particular, an electric vehicle or a hybrid vehicle when the prime mover of the drive train includes an electric machine. The motor vehicle has at least two axles, one of the axles being an axle of the motor vehicle drivable by the drive train. The drive train according to the invention is effective at this drive axle, and a drive power of the prime mover is transferred via the transmission onto the wheels of the motor vehicle, which are operatively connected to the output shafts. It is also conceivable to provide a drive train according to the invention for each axle of the motor vehicle, such that each axle is a driven axle.

The above definitions and explanations of the technological effects, advantages and advantageous embodiments of the transmission according to the invention, according to the first aspect of the invention, also apply analogously to the drive train according to the invention, according to the second aspect of the invention, and to the motor vehicle according to the invention, according to the third aspect of the invention.

BRIEF DESCRIPTION OF THE DRAWINGS

An exemplary embodiment of the invention is explained in greater detail in the following with reference to the drawings, and identical or similar elements are labeled with the same reference character, wherein.

DETAILED DESCRIPTION

Figures 1, 2:
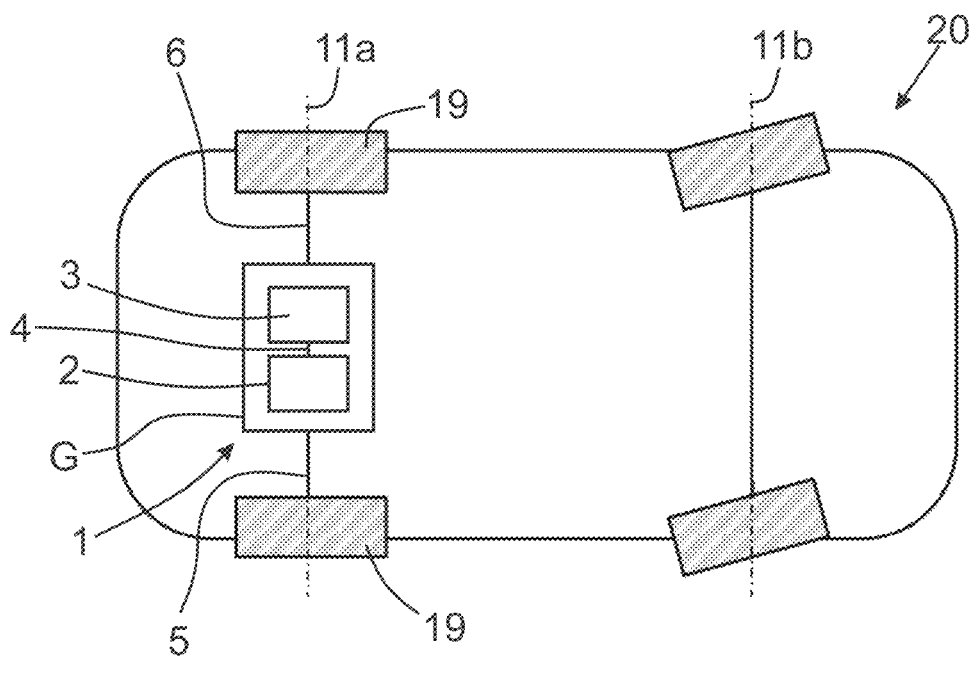
FIG. 1 shows a simplified schematic view of a motor vehicle according to the invention with a drive train according to the invention.
FIG. 2 shows a highly schematicized view of a transmission of the drive train according to the invention shown in FIG. 1.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a motor vehicle 20 having two axles 11$a$, 11$b$, and a drive train 1 being drivingly arranged at the first axle 11$a$ according to the invention. The motor vehicle 20 is an electric vehicle in this case, the motor vehicle 20 being driven purely electrically by the drive train 1. The first axle 11$a$ is either a front axle or a rear axle of the motor vehicle 1 and is a driven axle of the motor vehicle 1. In this case, the first axle 11$a$ is the rear axle or the non-steerable axle of the motor vehicle 1. The drive train 1 includes a prime mover 2, which is an electric machine, and a transmission 3 which is drivingly connected thereto. The design and the arrangement of the transmission 3 are explained in greater detail in the following figures. The configuration of the prime mover 2 is not shown here. The prime mover 2, or the electric machine, also has an accumulator, which supplies the prime mover 2 with electrical energy, and a power electronics system for the open-loop control and closed-loop control of the prime mover 2. A rotor (not shown here), which is arranged so as to be rotatable with respect to the stator and is connected to an input shaft 4 of the transmission 3 for conjoint rotation, is set into a rotational movement in relation to the stator by energizing the stator (not shown here). The drive power of the prime mover 2 is directed via the input shaft 4 into the transmission 3, and there, is converted by a differential 7 (FIG. 2) and at least indirectly split by the differential 7 onto a first output shaft 5 toward the left and onto a second output shaft 6 toward the right. The prime mover 2 is coaxial to the integral differential 7.

A respective wheel 19 is at least indirectly connected at each of the ends of the output shafts 5, 6, which are coaxial in the present case, in order to drive the motor vehicle 20. Joints and wheel hubs are arrangeable between the respective wheel 19 and the output shafts 5, 6, in particular to compensate for possible inclinations of the output shafts 5, 6. These are not shown or described in greater detail here.

The transmission 3 shown in more detail in FIG. 2 is a differential gear and has two planetary gear sets P1, P2, which are operatively connected to one another. The output shafts 5, 6 are coaxial and extend in opposite directions toward the wheels 19 shown in FIG. 1.

As shown in FIG. 2, the integral differential 7 particularly has a first planetary gear set P1, which includes multiple gear set elements, and a second planetary gear set P2, which also includes multiple gear set elements and is operatively connected to the first planetary gear set P1. By the first planetary gear set P1, a first output torque is transmittable onto the first output shaft 5, and a support torque of the first planetary gear set P1 is convertible in the second planetary gear set P2 such that a second output torque, which corresponds to the first output torque, is transmittable onto the second output shaft 6.

In the present case, the two planetary gear sets P1, P2 are both negative planetary gear sets. On the first planetary gear set P1, the first gear set element is a first sun gear P1.1, the second gear set element is a first planet carrier P1.2 and the third gear set element is a first ring gear P1.3. Multiple first planet gears P1.4 are rotatably mounted on the first planet carrier P1.2 and are meshed with the first sun gear P1.1 and the first ring gear P1.3. The first output shaft 5 extends axially through the first sun gear P1.1 of the first planetary gear set P1, the input shaft 4, and the prime mover 2. The first sun gear P1.1 is a ring gear, and the input shaft 4 is a hollow shaft connected to the first sun gear P1.1 for conjoint rotation. The first sun gear P1.1 and the input shaft 4 are integrally connected to one another. Furthermore, on the second planetary gear set P2, the first gear set element is a second sun gear P2.1, the second gear set element is a second planet carrier P2.2 and the third gear set element is a second ring gear P2.3. Multiple second planet gears P2.4 are rotatably mounted on the second planet carrier P2.2 and are meshed with the second sun gear P2.1 and the second ring gear P2.3. The planet gears P1.4, P2.4 are rotatably mounted via planet shafts (not shown here) on the associated planet carrier P1.2, P2.2.

The first ring gear P1.3 of the first planetary gear set P1 is connected via a connecting component 14 (or "connector 14") to the second sun gear P2.1 of the second planetary gear set P2 for conjoint rotation, said connecting component 14 being a coupling shaft. This connection between the planetary gear sets P1, P2 is described in greater detail in the following. The second planet carrier P2.2 of the second planetary gear set P2 is supported in a housing-fixed manner against the positionally fixed component G, which is the transmission housing in the present case. The second ring gear P2.3 of the second planetary gear set P2 is connected to the second output shaft 6 for conjoint rotation directly or via a coupling element or the like, which coupling element is optionally a ring gear carrier.

Figure 3:
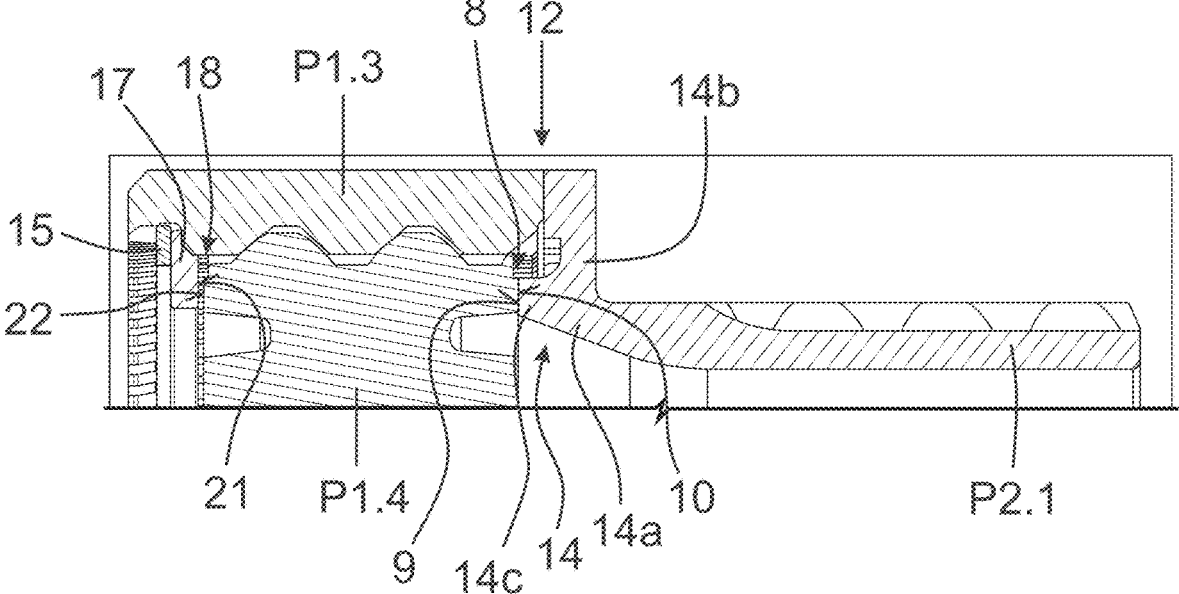
FIG. 3 shows a schematic longitudinal sectional representation of a portion of the transmission according to the invention shown in FIG. 2 for illustrating an operative connection between a first planetary gear set and a second planetary gear set of the transmission.

The two planetary gear sets P1, P2 are axially adjacent to one another in the present case, and the first planetary gear set P1 is arranged axially between the prime mover 2 and the second planetary gear set P2. In addition, an outer diameter of the first ring gear P1.3 of the first planetary gear set P1 is greater than an inner diameter of the second sun gear P2.1 of the second planetary gear set P2, with the second sun gear P2.1 being at least indirectly connected to the first ring gear P1.3 for conjoint rotation. In addition, an inner diameter of the first ring gear P1.3 of the first planetary gear set P1 is greater than an inner diameter of the second sun gear P2.1 of the second planetary gear set P2, with the second sun gear P2.1 being at least indirectly connected to said first ring gear P1.3 for conjoint rotation. Sun gear teeth are formed on the outer diameter of the second sun gear P2.1. Ring gear teeth are formed on the inner diameter of the first ring gear P1.3, as shown in FIG. 3. The radial offset between the first ring gear P1.3 and the second sun gear P2.1 is compensated for by the connecting component 14.

As shown in FIG. 3, the connecting component 14 and the first ring gear P1.3 are materially bonded via a weld 12. In addition, the connecting component 14 and the sun gear P2.1 of the second planetary gear set P2 are formed in one piece. The connecting component 14 has an axially extending portion 14a, a radially extending portion 14b, and an axial projection 14c.

A first thrust collar 8 is effective between the connecting component 14 and the first planet gears P1.4 of the first planetary gear set P1. A second thrust collar 18 is effective between a pressure disk 17, which is arranged on the first ring gear P1.3 in an axially fixed manner, and the first planet gears P1.4 of the first planetary gear set P1. The first thrust collar 8 has a first opposing running surface 9, which is formed on the connecting component 14 and is integrally formed on an axial projection 14c of the connecting component 14, and a second opposing running surface 10, which is formed on a side of the first planet gear P1.4 facing the connecting component 14. Opposite thereto, i.e., on the opposite side of the first planet gear P1.4, the second thrust collar 18 is provided, the second thrust collar 18 having a third opposing running surface 21, which is formed on the pressure disk 17, and a fourth opposing running surface 22, which is formed on a side of the first planet gear P1.4 facing the pressure disk 17. The pressure disk 17 is axially secured on the first ring gear P1.3. Particularly, a first securing ring 15 is accommodated on the first ring gear P1.3 such that the pressure disk 17 is axially fixed on the first ring gear P1.3. Therefore, each first planet gear P1.4 together with the connecting component 14 forms a first thrust collar 8 and, together with the pressure disk 17, forms a second thrust collar 18. In addition, the first ring gear P1.3 and the connecting component 14 are axially secured with respect to one another. This axial retention between the first ring gear P1.3 and the connecting component 14 is implemented by the weld 12.

The axial distance between the first opposing running surface 9 on the connecting component 14, or on the axial projection 14c on the connecting component 14, and the third opposing running surface 21 on the pressure disk 17 is greater than the axial length of the first planet gears P1.4, such that the first planet gears P1.4 do not rest or glide, with their opposing running surfaces 10, 22, on the associated opposing running surfaces 9, 21 during normal operation. Instead, the system automatically adjusts itself during normal operation such that the opposing running surfaces 9, 10, 21, 22 are used only to axially position and secure the first planet gears P1.4, in particular when load peaks, or the like, occur. Therefore, the first planet gears P1.4 slide, if at all, only temporarily, or briefly, on the third opposing running surface 21 of the pressure disk 17 or on the first opposing running surface 9 of the connecting component 14, thereby minimizing losses due to friction.

The invention is not limited to the disclosed embodiments. Other embodiments or variations result for a person skilled in the art within the scope of the utilization of the present invention and within the scope of a precise analysis of the drawings, the disclosure, and the following claims. In an alternative embodiment (not shown here), the connecting component 14 and the second sun gear P2.1 are formed in two pieces. In such embodiment, the second sun gear P2.1, after production of its external toothing, is material bonded with the connecting component 14, for example, via a weld, similarly to the weld 12 shown in FIG. 3, or via an adhesive surface or the like. As a result, the external toothing of the second ring gear P2.1 is advantageously produced without substantial limitations in the geometry of the tools. It is also conceivable that the connecting component 14 is connected to the second sun gear P2.1 by an interlocking connection.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 drive train
2 prime mover
3 transmission
4 input shaft
5 first output shaft
6 second output shaft
7 differential
8 first thrust collar
9 first opposing running surface of the first thrust collar
10 second opposing running surface of the first thrust collar
11a first axle
11b second axle
12 weld
14 connecting component
14a axially extending portion of the connecting component
14b radially extending portion of the connecting component
14c axial projection on the connecting component
15 first securing ring
16 second securing ring
17 pressure disk
18 second thrust collar
19 wheel
20 motor vehicle
21 third opposing running surface of the second thrust collar
22 fourth opposing running surface of the second thrust collar
G positionally fixed component
P1 first planetary gear set
P1.1 sun gear of the first planetary gear set
P1.2 planet carrier of the first planetary gear set
P1.3 ring gear of the first planetary gear set
P1.4 planet carrier of the first planetary gear set
P2 second planetary gear set
P2.1 sun gear of the second planetary gear set
P2.2 planet carrier of the second planetary gear set
P2.3 ring gear of the second planetary gear set
P2.4 planet carrier of the second planetary gear set

The invention claimed is:

1. A transmission (3) for a drive train (1) of a motor vehicle (20), comprising:

an input shaft (4);

a first output shaft (5);

a second output shaft (6); and a differential (7) between the input shaft (4) and the first and second output shafts (5, 6), the differential (7) comprising:

a first planetary gear set (P1), a first gear set element of the first planetary gear set (P1) being connected to the input shaft (4) for conjoint rotation, a second gear set element of the first planetary gear set (P1) being at least indirectly connected to the first output shaft (5) for conjoint rotation, and a third gear set element of the first planetary gear set (P1) being a ring gear (P1.3);

a second planetary gear set (P2) operatively connected to the first planetary gear set (P1), a first gear set element of the second planetary gear set (P2) being a sun gear (P2.1) at least indirectly connected to the third gear set element of the first planetary gear set (P1) for conjoint rotation, a second gear set element of the second planetary gear set (P2) being non-rotationally connected to a positionally fixed component (G), and a third gear set element of the second planetary gear set (P2) being at least indirectly connected to the second output shaft (6) for conjoint rotation; and a connector (14) connecting the sun gear (P2.1) of the second planetary gear set (P2) and the ring gear (P1.3) of the first planetary gear set (P1) for conjoint rotation, the connector (14) and the ring gear (P1.3) of the first planetary gear set (P1) being integrally bonded by being joined via material bonding, wherein an outer diameter of the ring gear (P1.3) of the first planetary gear set (P1) is greater than an inner diameter of the sun gear (P2.1) of the second planetary gear set (P2), wherein the connector (14) comprises an essentially radially extending portion (14b) bridging a difference in radial diameter between the sun gear (P2.1) of the second planetary gear set (P2) and the ring gear (P1.3) of the first planetary gear set (P1), and wherein the radially extending portion (14b) is joined to the ring gear (P1.3) of the first planetary gear set (P1) via the material bonding at a radial height of the ring gear (P1.3) of the first planetary gear set (P1).

2. The transmission (3) of claim 1, wherein the first planetary gear set (P1) is axially adjacent to the second planetary gear set (P2).

3. The transmission (3) of claim 1, wherein a first thrust collar (8) is defined between the connector (14) and at least one first planet gear (P1.4) of the first planetary gear set (P1).

4. The transmission (3) of claim 3, wherein the first thrust collar (8) has a first opposing running surface (9) defined by the connector (14), and a second opposing running surface (10) defined by a side of each of the at least one first planet gear (P1.4) of the first planetary gear set (P1) facing the connector (14).

5. The transmission (3) of claim 1, further comprising a pressure disk (17) axially fixed at the ring gear (P1.3) of the first planetary gear set (P1), wherein a second thrust collar (18) is defined between the pressure disk (17) and at least one first planet gear (P1.4) of the first planetary gear set (P1).

6. The transmission (3) of claim 5, wherein the second thrust collar (18) has a third opposing running surface (21) defined by the pressure disk (17), and a fourth opposing running surface (22) defined by a side of each of the at least one first planet gear (P1.4) of the first planetary gear set (P1) facing the pressure disk (17).

7. The transmission (3) of claim 1, wherein the connector (14) and the sun gear (P2.1) of the second planetary gear set (P2) are formed in one piece.

8. The transmission (3) of claim 1, wherein the first gear set element of the first planetary gear set (P1) is a sun gear (P1.1) of the first planetary gear set (P1), the second gear set element of the first planetary gear set (P1) is a planet carrier (P1.2) of the first planetary gear set (P1), the second gear set element of the second planetary gear set (P2) is a planet carrier (P2.2) of the second planetary gear set (P2), and the third gear set element of the second planetary gear set (P2) is a ring gear (P2.3) of the second planetary gear set (P2).

9. A drive train (1) for a motor vehicle (20), comprising:

the transmission (3) of claim 1; and a prime mover (2) operatively connected to the transmission (3).

10. The drive train (1) of claim 9, wherein the first planetary gear set (P1) is arranged axially between the prime mover (2) and the second planetary gear set (P2).

11. A motor vehicle (20), comprising the drive train (1) of claim 9.

* * * * *